US 7,418,500 B1

(12) United States Patent
Bolinger et al.

(10) Patent No.: US 7,418,500 B1
(45) Date of Patent: Aug. 26, 2008

(54) MECHANISM FOR CONTROLLED SHARING OF FILES IN A CLUSTERED APPLICATION ENVIRONMENT

(75) Inventors: Don Bolinger, Concord, MA (US); Arthur Lent, Cambridge, MA (US); Jeffrey Silberman, San Francisco, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 618 days.

(21) Appl. No.: 10/106,017

(22) Filed: Mar. 25, 2002

(51) Int. Cl.
*G06F 15/16* (2006.01)
*G06F 7/00* (2006.01)
*H04L 9/00* (2006.01)

(52) U.S. Cl. .................. 709/225; 709/219; 713/159; 707/8; 707/9; 707/10

(58) Field of Classification Search ......... 709/223–225, 709/229, 205, 216, 219; 713/159, 165–172; 707/8–10, 210
See application file for complete search history.

(56) References Cited

U.S. PATENT DOCUMENTS

| | | | |
|---|---|---|---|
| 5,163,131 A | 11/1992 | Row et al. | |
| 5,355,453 A | 10/1994 | Row et al. | |
| 5,485,579 A | 1/1996 | Hitz et al. | |
| 5,634,122 A * | 5/1997 | Loucks et al. | 707/8 |
| 5,802,366 A | 9/1998 | Row et al. | |
| 5,819,292 A | 10/1998 | Hitz et al. | |
| 5,931,918 A | 8/1999 | Row et al. | |
| 5,941,972 A | 8/1999 | Hoese et al. | |
| 5,963,962 A | 10/1999 | Hitz et al. | |
| 6,038,570 A | 3/2000 | Hitz et al. | |
| 6,065,037 A | 5/2000 | Hitz et al. | |
| 6,078,948 A * | 6/2000 | Podgorny et al. | 709/204 |
| 6,119,244 A | 9/2000 | Schoenthal et al. | |
| 6,122,631 A * | 9/2000 | Berbec et al. | 707/9 |
| 6,385,701 B1 * | 5/2002 | Krein et al. | 711/141 |
| 6,425,035 B2 | 7/2002 | Hoese et al. | |
| 6,493,804 B1 * | 12/2002 | Soltis et al. | 711/152 |
| 6,571,276 B1 * | 5/2003 | Burns et al. | 709/212 |
| 6,594,662 B1 * | 7/2003 | Sieffert et al. | 707/10 |
| 6,615,225 B1 * | 9/2003 | Cannon et al. | 707/204 |
| 6,681,225 B1 * | 1/2004 | Uceda-Sosa et al. | 707/8 |
| 6,771,640 B2 * | 8/2004 | Karamchedu et al. | 370/352 |
| 6,965,893 B1 * | 11/2005 | Chan et al. | 707/8 |

(Continued)

OTHER PUBLICATIONS

David Hitz et al. TR3002 File System Design for a NFS File Server Appliance published by Network Appliance, Inc.

(Continued)

*Primary Examiner*—Nathan Flynn
*Assistant Examiner*—Jerry B Dennison
(74) *Attorney, Agent, or Firm*—Cesari and McKenna, LLP

(57) ABSTRACT

A mechanism for controlled sharing of files by clustered applications is provided. The mechanism expands a distributed file access protocol, such as the direct access file system protocol, by including an open with share token command and an open_downgrade operation to adjust the access and deny levels for a given resource.

15 Claims, 6 Drawing Sheets

U.S. PATENT DOCUMENTS

| | | | |
|---|---|---|---|
| 6,973,493 B1* | 12/2005 | Slaughter et al. | 709/225 |
| 7,047,299 B1* | 5/2006 | Curtis | 709/225 |
| 7,103,616 B1* | 9/2006 | Harmer et al. | 707/201 |
| 7,171,581 B2* | 1/2007 | Wu | 714/4 |
| 7,200,869 B1* | 4/2007 | Hacherl et al. | 726/27 |
| 2002/0103734 A1* | 8/2002 | Glassco et al. | 705/35 |
| 2002/0112022 A1 | 8/2002 | Kazar et al. | |
| 2002/0116593 A1 | 8/2002 | Kazar et al. | |
| 2002/0184149 A1* | 12/2002 | Jones | 705/41 |
| 2003/0093524 A1* | 5/2003 | Goldick | 709/225 |
| 2004/0199734 A1* | 10/2004 | Rajamani et al. | 711/163 |
| 2007/0044144 A1* | 2/2007 | Knouse et al. | 726/8 |
| 2007/0124467 A1* | 5/2007 | Glassco et al. | 709/225 |

OTHER PUBLICATIONS

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

Fielding et al. (1999) Request for Comments (RFC) 2616, HTTP/1.1.

DAFS: Direct Access File System Protocol, Version 1.0, Network Appliance, Inc., Sep. 1, 2001.

Virtual Interface Architecture Specification, Version 1.0, published by a collaboration between Compaq Computer Corp., Intel Corp., and Microsoft Corp., Dec. 16, 1997.

* cited by examiner

MECHANISM FOR CONTROLLED SHARING OF FILES IN A CLUSTERED APPLICATION ENVIRONMENT

FIELD OF THE INVENTION

The present invention relates to clustered computing environments and, more specifically, to synchronization among applications accessing a shared resource of a clustered application environment using a distributed file system protocol.

BACKGROUND OF THE INVENTION

A file server is a computer that provides file service relating to the organization of information on writeable persistent storage devices, such as memories, tapes or disks. The file server or filer may be embodied as a storage system including a storage operating system that implements a file system to logically organize the information as a hierarchical structure of directories and files on, e.g. the disks. Each "on-disk" file may be implemented as a set of data structures, e.g. disk blocks, configured to store information, such as the actual data for the file. A directory, on the other hand, may be implemented as a specially formatted file in which information about other files and directories are stored.

A filer may be further configured to operate according to a client/server model of information delivery to thereby allow many client systems (clients) to access shared resources, such as files, stored on a server, e.g. the filer. In this model, the client may comprise an application, such as a database management system (DBMS), executing on a computer that "connects" to the filer over a computer network, such as a point-to-point link, shared local area network (LAN), wide area network (WAN) or virtual private network (VPN) implemented over a public network, such as the Internet. Each client may request the services of the filer by issuing file system protocol messages (in the form of packets) to the filer over the network. By supporting a plurality of file system protocols, such as the Network File Service version 4 (NFSv4) and the Direct Access File System (DAFS) protocols, the utility of the filer may be enhanced for networking clients.

A DBMS application is a program that allows one or more users or clients to create and access data stored in a set of files or database coupled to, e.g., a filer. The DBMS application manages client requests to access the database without requiring them to specify the physical location of the data on the storage devices. In handling client requests, the DBMS application ensures the integrity of the data (i.e., ensuring that the data continues to be accessible and is consistently organized as intended) and the security of the data (i.e., ensuring only those with appropriate privileges can access the data). The integrity and security of a database is particularly relevant in parallel or distributed system computing environments.

Clustered computing is a type of parallel or distributed system computing comprising a collection of interconnected computers (or nodes) that cooperate to provide a single, unified computing resource. In a common arrangement of a cluster, at least one of the cluster nodes functions as a file server or filer configured to provide service to the remaining cluster nodes functioning as clients in accordance with the client/server model of information delivery. The clustered computing environments are advantageous, in that they increase availability and scaling of the computing resource, while enhancing the performance of data sharing applications among the interconnected nodes.

An example of clustered computing is clustering at the operating system level among the client and server nodes of a cluster. In this style of clustering, the operating system controls access to the shared resources (files) coupled to a server to thereby ensure a consistent "view" of the files by the client nodes of the cluster. That is, the complexity of coordinating and synchronizing access to shared resources is "hidden" beneath the operating system of each node. Applications executing on the client nodes are unaware that they are executing in a clustered environment. For example, a file stored on a disk attached to a server node "appears" local to a client node by the clustered operating system. The applications executing on the clients may therefore be relatively simple; that is, they may open and close file as if all accesses occur on the local client node.

However, these "naive" applications running on top of a clustered operating system environment require operating system synchronization of each update (modification) made by an application to a shared file. This ensures that updates made by various applications are not lost or incorrectly recorded at the database in a manner that may disrupt the consistent view of the current state of the shared resource. Essentially, the operating system synchronizes all accesses to the shared file on behalf on all requesting clients of the cluster.

A different style of clustered computing is application-style clustering wherein applications, such as a DBMS, generally do not depend on specific operating system services to synchronize client accesses to a shared resource, such as a database. According to this style of clustering, applications accept more responsibility for coordination and synchronization of shared resource accesses in order to simplify their interactions with the operating system. That is, the applications executing on the various client nodes of a cluster communicate in order to coordinate their activities with respect to accessing shared resources of the cluster. Essentially, the only operating system synchronization needed for this cluster application environment involves initial access by each application to open a shared resource (such as a file). Once the application is granted open access, those client applications that have been allowed access to open the file are responsible for coordinating and synchronizing further accesses to the shared file.

The NFSv4 protocol is a distributed file system protocol that extends previous versions of NFS to integrate, among other things, file locking capabilities that enhance client performance when accessing shared resources (files) over high bandwidth networks. An example of a file locking capability is a "share reservation" that grants a client access to open a file and the ability to deny other clients open access to the same file. A share reservation is similar to a file or record lock, except that its granularity is always on an entire file and its lifetime equals the duration of the file open operation. For example, a client application may open a file for read access and acquire a share reservation denying other subsequent open operations that request write access. An NFSv4 open operation takes as parameters the desired access of read or write and, in addition, allows the requesting application to deny read or write access to other client applications.

The DAFS protocol is a file access and management protocol designed for local file sharing or clustered environments. This distributed file system protocol provides low latency, high throughput and low overhead data movement that takes advantage of memory-to-memory networking technologies. Notably, the DAFS protocol defines a set of file management and file access operations for local file sharing requirements. However, the DAFS protocol does not provide support for client requests to open files located on a server of a clustered application environment. The present invention is directed, in part, to providing such support for the DAFS protocol.

SUMMARY OF THE INVENTION

The invention comprises a mechanism for coordinating controlled access to a shared resource of a server by clients collaborating in a clustered application environment using a distributed file system protocol. The mechanism extends the distributed file system protocol by specifying an open with share token operation that provides a precisely targeted synchronization service to explicitly clustered applications executing on the clients of the environment. Specifically, the mechanism provides a synchronization service that coordinates an initial access (e.g., open) to the shared resource (e.g., a file) by a client application using the share token parameter associated with the open operation of the distributed file system protocol. The invention thus provides support at the file open level for a clustered application using the distributed file system protocol.

In the illustrative embodiment, the distributed file system protocol is preferably the direct access file system (DAFS) protocol employed by clients of the cluster to access a shared resource, which is preferably a database of files coupled to a server of the cluster. The applications executing on the clients are preferably instances of a database management system (DBMS) that corporate to distribute the share token among themselves to determine cluster membership and to enable access to the shared database resource. Client application instances in possession of the current token are allowed access to the database files, while those instances that are not in possession of the token are denied access. These application instances explicitly synchronize their accesses to the database and require operating system assistance only to grant or deny an initial access to the resources comprising the database.

Specifically, clients requesting open access to the database files present the share token to an operating system executing on the server node of the cluster using the novel open with share token operation to validate their access request. The share token of the first client application instance to open the shared files is associated with those files (at the server) and is used to ensure that all subsequent accessing client application instances share the same token. That is, the token functions as an indication that all client applications requesting access to the shared database files have coordinated among themselves.

According to an aspect of the present invention, various levels of access are provided as additional parameters to the open with share token operation; illustratively, these levels of access are inherited from the NFSv4 share reservation operation to thereby provide a share token reservation. The share token reservation is provided to aid a cluster application to, among other things, detect rogue instances of a client application that are trying to perform conflicting accesses to the shared resource files. Thus, the share token reservations ensure that all client application instances of a clustered application environment can access the shared resource, while ensuring that another client application participating in a different clustered application environment is denied access to the shared resource.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Storage System Environment

Figure 1:
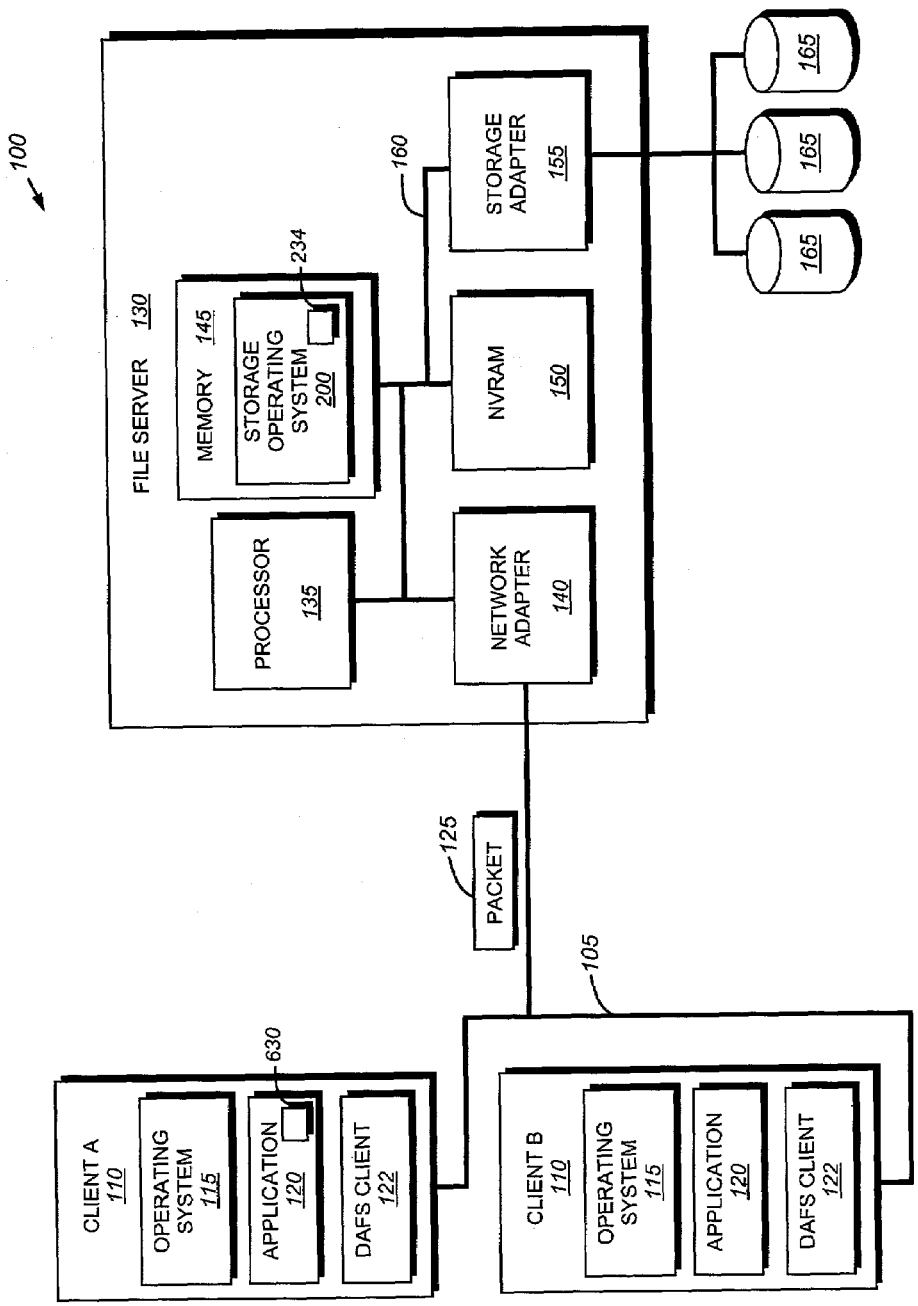
FIG. 1 is a schematic block diagram of an exemplary network environment including a plurality of clients in a file server that may be advantageously used for the present invention.

FIG. 1 is a schematic block diagram of a storage system environment 100 that includes a plurality of clients 110 having an operating system 115 and one or more applications 120, and an interconnected file server 130 that may be advantageously used with the present invention. The filer server or "filer" 130 is a computer that provides file service relating to the organization of information on storage devices, such as disks 165. It will be understood to those skilled in the art that the inventive technique described herein may apply to any type of special-purpose computer (e.g., server) or general-purpose computer, including a standalone computer. The filer 130 comprises a processor 135, a memory 145, a network adapter 140 and a storage adapter 155 interconnected by a system bus 160. The filer 130 also includes a storage operating system 200 located in memory 145 that implements a file system to logically organize the information as a hierarchical structure of directories and files on the disks.

It will be understood to those skilled in the art that the inventive technique described herein may apply to any type of special-purpose computer (e.g., file serving appliance) or general-purpose computer, including a standalone computer, embodied as a storage system. To that end, filer 130 can be broadly, and alternatively, referred to as storage system. Moreover, the teachings of this invention can be adapted to a variety of storage system architectures including, but not limited to, a network-attached storage environment, a storage area network and disk assembly directly-attached to a client/host computer. In addition, it would be apparent to those skilled in the art that the inventive mechanism described herein may apply to any type of special-purpose (e.g., file serving application) or general-purpose computer, including a stand alone computer or portion thereof, embodied as or including a storage system.

The clients 110 and filer 130 of computer network 105 are preferably organized as a clustered application environment wherein all applications (or instances of an application) executing on the clients explicitly synchronize their accesses to shared resources (e.g., files) stored in the disks 165. Each client includes an operating system 115, one or more applications 120 and, in the illustrative embodiment, direct access file system (DAFS) client functionality 122. The DAFS client functionality can be implemented by, e.g., software executing within the operating system and coordinating with an appropriate network interface controller (not shown). In addition, the application 120 executed on the client 110 may comprise a database management system (DBMS) application or any other application that can run in a clustered application environment and prefer the synchronization needed between instances of the application running on various clients of the cluster. Moreover, the teachings of this invention can be adapted to a variety of storage system architectures, including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

In the illustrative embodiment, the memory 145 comprises storage locations that are addressable by the processor and adapters for storing software program code. The memory comprises a form of random access memory (RAM) that is generally cleared by a power cycle or other reboot operation (e.g. it is a "volatile" memory). The processor and adapters may, in turn, comprise processing elements and/or logic circuitry configured to execute the software code and manipulate the data structures. The operating system 200, portions of which are typically resident in memory and executed by the processing elements, functionally organizes the filer by, inter alia, invoking storage operations in support of a file service implemented by the filer. Included within the storage operating system 200 is support for a DAFS server 234, described further below. It will be apparent to those skilled in the art that other processing and memory means, including various computer readable media, may be used for storing and executing program instructions pertaining to the inventive technique described herein.

The network adapter 140 comprises the mechanical, electrical and signaling circuitry needed to connect the filer 130 to a client 110 over a computer network 105, which may comprise a point-to-point connection or a shared medium, such as a local area network. The client 110 may be a general-purpose computer configured to execute applications 120, such as a DBMS application. Moreover, the client 110 may interact with the filer 130 in accordance with a client/server model of information delivery. That is, the client may request the services of the filer, and the filer may return the results of the services requested by the client, by exchanging packets 125 encapsulating, e.g., the DAFS protocol format over the network 105. The format of DAFS protocol packets exchanged over the network is well-known and described in *DAFS: Direct Access File System Protocol, Version* 1.0, by Network Appliance, Inc. dated Sep. 1, 2001, which is hereby incorporated by reference.

The storage adapter 155 cooperates with the operating system 200 executing on the filer to access information requested by the client. The information may be stored on the disks 165 of a disk array that is attached, via the storage adapter 155 to the filer 130 or other node of a storage system as defined herein. The storage adapter 155 includes input/output (I/O) interface circuitry that couples to the disks over an I/O interconnect arrangement, such as a conventional high-performance, Fibre Channel serial link topology. The information is retrieved by the storage adapter and, if necessary, processed by the processor 135 (or the adapter 155 itself) prior to being forwarded over the system bus 160 to the network adapter 140, where the information is formatted into a packet and returned to the client 110.

In one exemplary filer implementation, the filer 130 can include a nonvolatile random access memory (NVRAM) 150 that provides fault-tolerant backup of data, enabling the integrity of filer transactions to survive a service interruption based upon a power failure, or other fault. The size of the NVRAM depends in part upon its implementation and function in the file server. It is typically sized sufficiently to log a certain time-based chunk of transactions (for example, several seconds worth). The NVRAM is filled, in parallel with the memory, after each client request is completed, but before the result of the request is returned to the requesting client.

B. Storage Operating System

To facilitate generalized access to the disks 165, the storage operating system 200 (FIG. 2) implements a write-anywhere file system that logically organizes the information as a hierarchical structure of directories and files on the disks. Each "on-disk" file may be implemented as a set of disk blocks configured to store information, such as data, whereas the directory may be implemented as a specially formatted file in which other files and directories are stored. As noted above, in the illustrative embodiment described herein, the operating system is the NetApp® Data ONTAP™ operating system available from Network Appliance, Inc., that implements the Write Anywhere File Layout (WAFL™) file system. It is expressly contemplated that any appropriate file system can be used, and as such, where the term "WAFL" is employed, it should be taken broadly to refer to any file system that is otherwise adaptable to the teachings of this invention.

Again to summarize, as used herein, the term "storage operating system" generally refers to the computer-executable code operable on a storage system that implements file system semantics (such as the above-referenced WAFL) and manages data access. In this sense, Data ONTAP™ software is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

Figure 2:
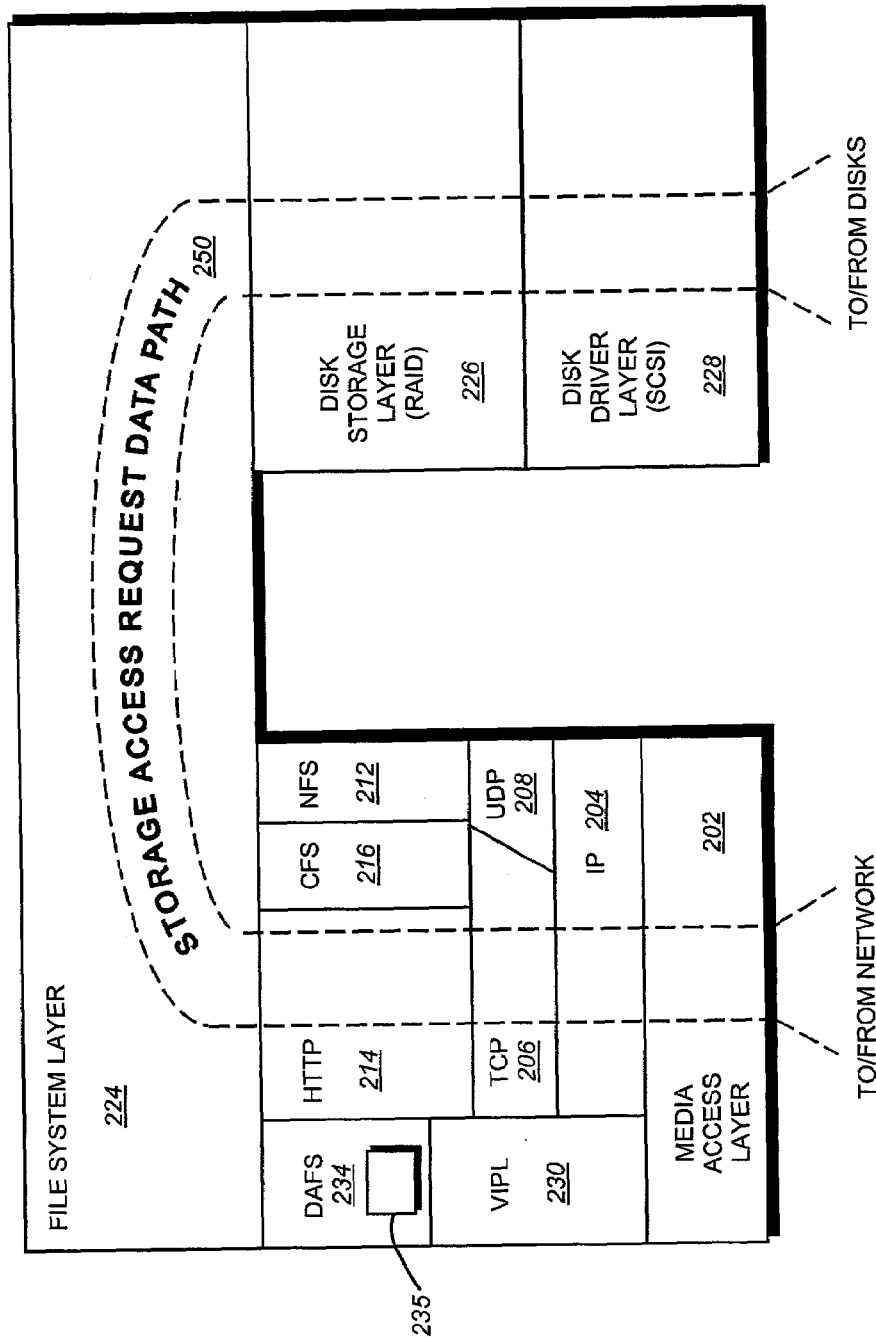
FIG. 2 is a schematic block diagram of an exemplary storage operating system that may be advantageously used with the present invention.

The organization of the preferred storage operating system for the exemplary filer is now described briefly. However, it is expressly contemplated that the principles of this invention can be implemented using a variety of alternate storage operating system architectures. As shown in FIG. 2, the storage operating system 200 comprises a series of software layers, including a media access layer 202 or network drivers (e.g., an Ethernet driver). The operating system further includes network protocol layers, such as the Internet Protocol (IP) layer 204 and its supporting transport mechanisms, the Transport Control Protocol (TCP) layer 206 and the User Datagram Protocol (UDP) layer 208.

Additionally the storage operating system includes a virtual interface provider layer (VIPL) 230, which implements the virtual interface (VI) architecture The architecture for the virtual interface (VI) is defined in *Virtual Interface Architecture Specification, Version* 1.0, published in collaboration between Compaq Computer Corporation, Intel Corporation and Microsoft Corporation, which is hereby incorporated by reference. This VIPL layer 230 provides the direct access transport capabilities required by the Direct Access File System. The requirements of a direct access transport (DAT) for use by the Direct Access File System are described in the above-incorporated DAFS specification. Generally, a DAT should support remote direct memory access (RDMA) and be capable of transmitting variable-sized data blocks. As such, the VIPL layer 230 should be taken as exemplary only. Any other suitable transport protocol that can accommodate the DAFS protocol can be utilized including, for example, Infini-Band™.

A file system protocol layer provides multi-protocol data access and, to that end, includes support for the CIFS protocol 216, the NFS protocol 212 and the Hypertext Transfer Protocol (HTTP) protocol 214 and the DAFS protocol 234. Within the DAFS layer 234, which implements the functionality associated with a DAFS server, is the implementation of an open file with share token and an open_downgrade function to modify shared access levels, described further below. The DAFS layer 234 enables the file server executing the storage operating system 200 to process DAFS requests from clients 110 acting as DAFS clients 122.

In addition, the storage operating system 200 includes a disk storage layer 226 that implements a disk storage protocol, such as a RAID protocol, and a disk driver layer 228 that implements a disk access protocol such as, e.g., a Small Computer Systems Interface (SCSI) protocol.

Bridging the disk software layers with the network and file system protocol layers is a file system layer 224 of the storage operating system 200. Generally, the layer 224 implements a file system having an on-disk format representation that is block-based using, e.g., 4-kilobyte (kB) data blocks and using inodes to describe the files. In response to transaction requests, the file system generates operations to load (retrieve) the requested data from disks 165 if it is not resident "in-core", i.e., in the filer's memory 145. If the information is not in memory, the file system layer 224 indexes into the inode file using the inode number to access an appropriate entry and retrieve a logical volume block number. The file system layer 224 then passes the logical volume block number to the disk storage (RAID) layer 226, which maps that logical number to a disk block number and sends the latter to an appropriate driver (for example, an encapsulation of SCSI implemented on a fibre channel disk interconnection) of the disk driver layer 228. The disk driver accesses the disk block number from disks 165 and loads the requested data in memory 145 for processing by the filer 130. Upon completion of the request, the filer (and storage operating system) returns a reply, e.g., a conventional acknowledgement packet defined by the DAFS specification, to the client 110 over the network 105.

It should be noted that the software "path" 250 through the storage operating system layers described above needed to perform data storage access for the client request received at the filer may alternatively be implemented in hardware or a combination of hardware and software. That is, in an alternate embodiment of the invention, the storage access request data path 250 may be implemented as logic circuitry embodied within a field programmable gate array (FPGA) or an application specific integrated circuit (ASIC). This type of hardware implementation increases the performance of the file service provided by filer 130 in response to a file system request packet 125 issued by client 110.

C. File System Share Tokens

The present invention comprises a mechanism for coordinating controlled access to a shared resource of a server by a set of clients collaborating in a clustered application environment using a distributed file system protocol, such as the DAFS protocol. The mechanism extends the distributed file system protocol by specifying an open with share token operation that provides a precisely targeted synchronization service to explicitly clustered applications executing on a set of clients. In addition, the mechanism further extends the distributed file system protocol to include share reservation-like level of access for the client issuing the open request, along with a level of denial for the remaining clients of the cluster desiring access to the shared resource. Advantageously, the share token parameter of the novel mechanism prevents rogue or non-member instances of the client application from accessing the shared resource, while the share reservation parameters enable explicit levels of access and/or denial to be specified by the client application.

Figure 3:
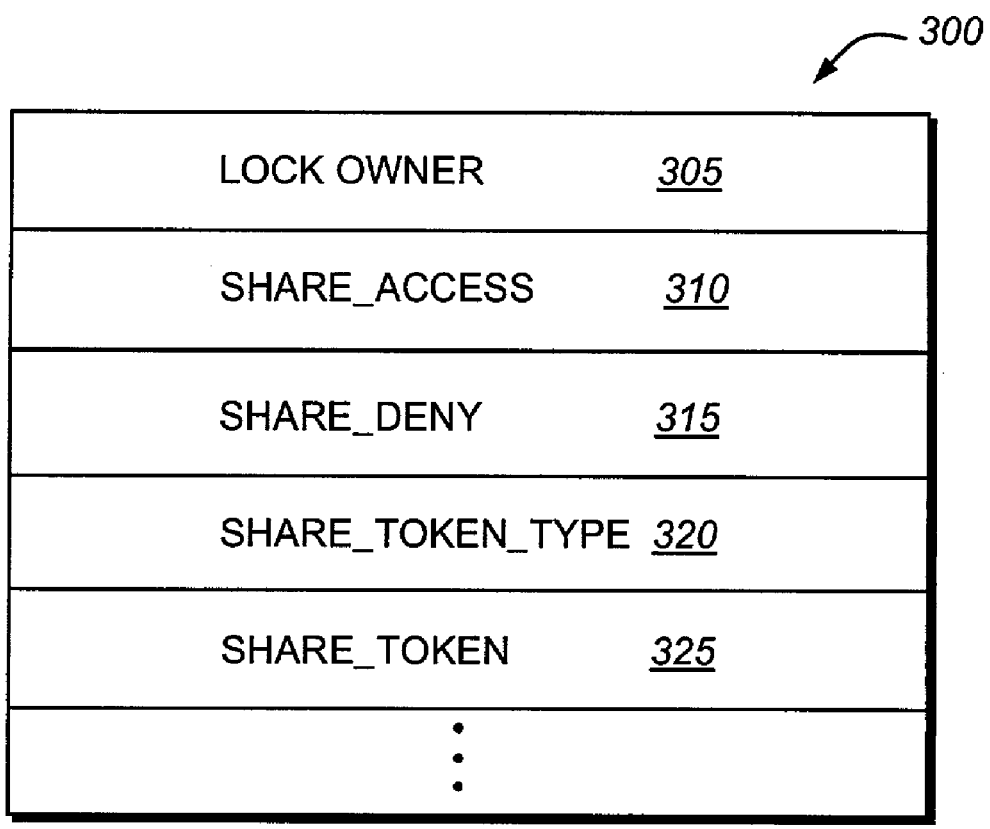
FIG. 3 is a schematic block diagram of an exemplary data structure passed to an open function within a file system in accordance with an embodiment of this invention.

FIG. 3 is a schematic block diagram illustrating a data structure 300 used by a client as an argument to the novel open with share token operation in accordance with the present invention. This data structure 300 can be passed to the open with share token function within a distinguished file system protocol. In the illustrative embodiment, this open with share functionality is added to the DAFS_PROC_OPEN operation described in the above-incorporated DAFS specification. The argument data structure 300 includes entries describing an application (lock owner 305) initiating the open with share token function, a level of access 310, a level of denial 315, a type of token 320 and the token to be utilized 325.

The token can be generated by the application using well-known techniques. In the illustrative embodiment, the token is of sufficient length to ensure that multiple applications will not generate an identical token or key. While the chance of two applications independently generating an identical token does exist, by making the token, in the illustrative embodiment, 64 bits in length, this chance is minimized. This open operation/procedure provides for share token reservations with use of the SHARE_TOKEN_TYPE and SHARE_TOKEN_FIELDS of the open data structure 300.

When initiating the open operation, a client specifies a SHARE_TOKEN_TYPE in entry 320 of data structure 300. If the value of SHARE_TOKEN_TYPE is not SHARE_TOKEN_NONE, then the client also must specify the target share token using element 325 (SHARE_TOKEN). Thus, for share token reservations, the client must specify a value for SHARE_TOKEN_TYPE that is either SHARE_TOKEN_NONE or SHARE_TOKEN_BOTH. If the client fails to specify such a value, then the server returns an error message. This error message is a value defined as ERR_INVAL. If an existing share token reservation conflicts with the requested open operation, then the server returns an error message TOKEN_MISMATCH.

These various flags or error messages can be implemented as constants that are defined within the distributed file system protocol so that clients and servers can react appropriately to the receipt of such an error.

Figure 4:
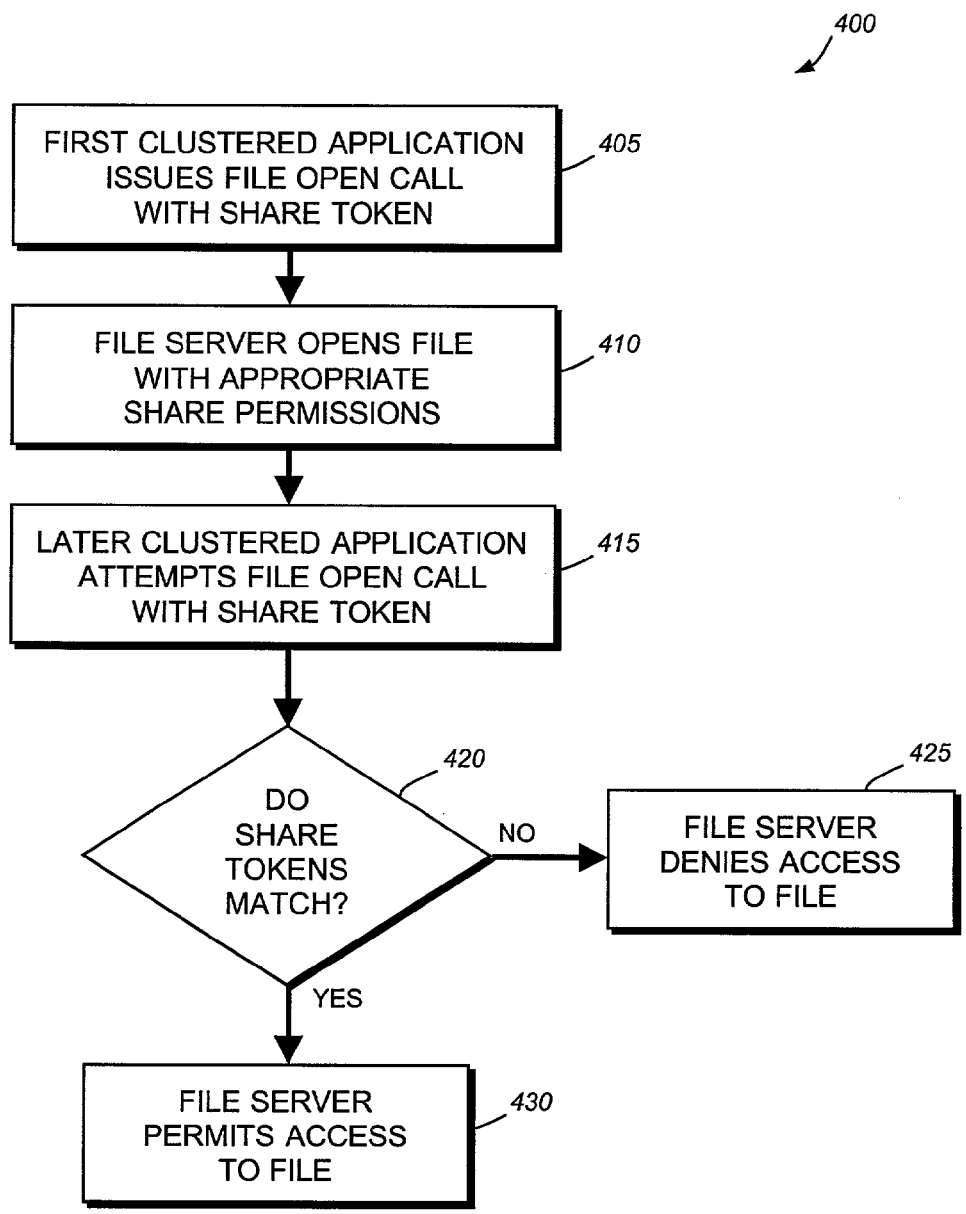
FIG. 4 is a flow chart detailing a procedure for opening a file with a share token in a clustered application environment in accordance with an embodiment of this invention.

An illustrative procedure 400 of opening a file by multiple instances of a clustered application is shown in FIG. 4. Initially, in step 405, a first clustered application instance issues a file open call with a proposed share token to the file server. In response, the file server, in step 410, opens the requested file with the appropriate sharing permissions and share token. The DAFS layer installs the proposed share token as the active share token for the requested file. If the file already has an active share token associated with it, the central authority will reject the proposed share token and will deny access to the file. Later, in step 415, another application instance within the cluster attempts to open a file with a shared token call to the already opened file. This later clustered application instance will pass a token using element 325, the SHARE_TOKEN field, of the open data structure 300. The file server will compare the share token sent by this later clustered application instance with the share token associated with the file when it was opened by the first clustered application instance (step 420). If the tokens do not match, then the file server will deny access to the file in step 425. This mismatch of tokens can result from, e.g. a rogue instance of an application that is attempting to access the file without being synchronized with the other instances of the clustered application. If the share tokens do match, the file server permits the access requested from the second or later clustered application (step 430).

According to another aspect of the invention, the inventive mechanism comprises an "open_downgrade" operation that further extends the distributed file system protocol. This operation allows clients to downgrade their access level to a shared resource when the client does not need as much access as previously obtained. That is, each client can request less access to the opened file using this operation (as opposed to requesting greater access). Notably, the open_downgrade operation modifies an existing open request that was previously issued by the server to the client and cannot be used to initiate a new open request.

Figure 5:
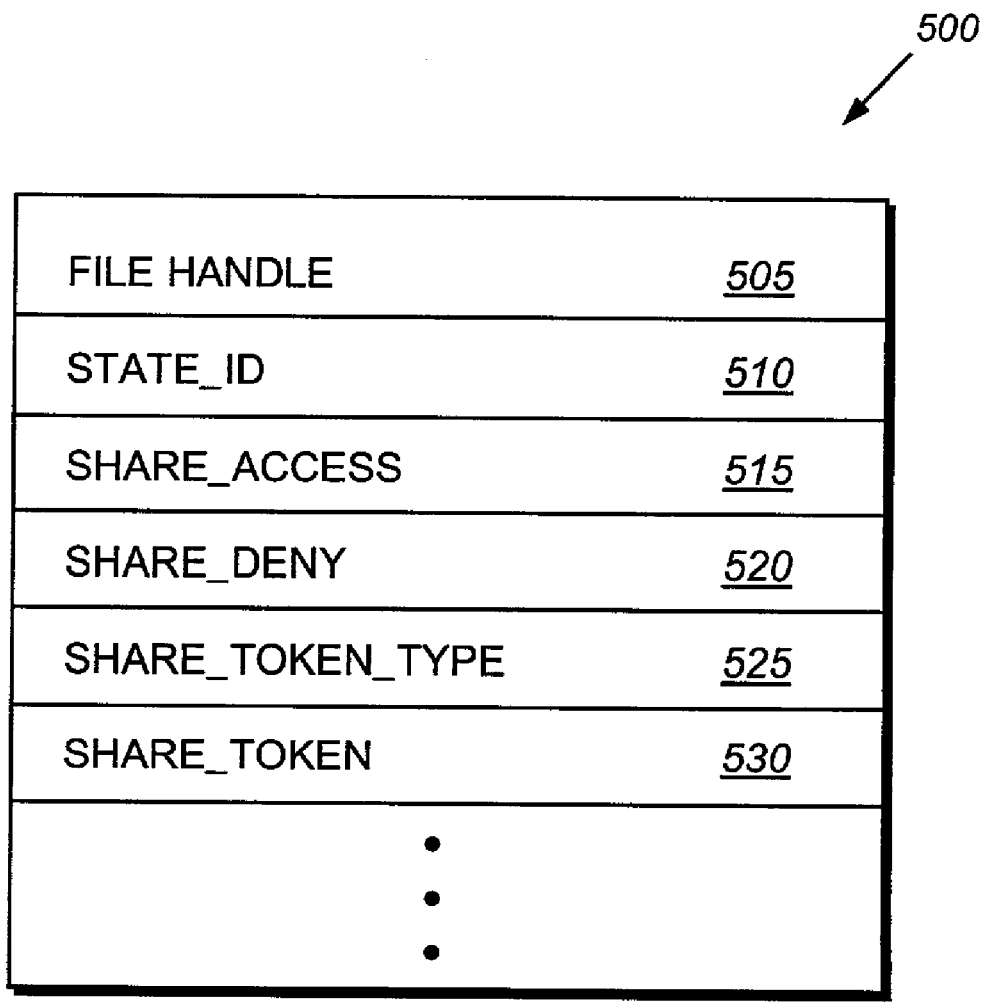
FIG. 5 is a schematic block diagram of an exemplary data structure used as an argument in conjunction with a modification of sharing privileges in accordance with an embodiment of this invention.

An exemplary data structure 500 used as an argument to this open_downgrade operation is shown in FIG. 5. The data structure 500 includes entries for a file handle 505 used to access the file, a state identifier 510, a level of share access 515, a level of share denial 520, the token type associated with the sharing 525 and a link or pointer to the share token 530.

Specifically, the "open_downgrade" operation is used to adjust the access and deny bits for a given open request. This is necessary when the lock owner (client) opens the same shared resource (file) multiple times with different access and deny parameters. In this situation, a close operation directed to one of the open requests may change the appropriate access and deny parameters to essentially remove bits associated with open request that is no longer in effect. The access and deny parameters specified in this operation replace the current parameters for the specified open file. If either the access or deny mode specified includes parameters not in effect for the open request, an error is returned to the client. Since access and deny parameters are subsets of those already granted, it is not possible for this request to be denied because of conflicting share reservations.

A client may also utilize the "open_downgrade" function when it wishes to release the share token. This can occur when, for example, a given share token holder desires to exit the group of clustered applications with access to a particular file. Thus, an application instance that is terminating can release its share token.

To again summarize, the present invention provides a precisely targeted synchronization service for file access to explicitly clustered applications executing on the clients. In addition, the mechanism further extends the DAFS or other distributed file system protocol to include share reservation-like level of access for the client issuing the open request, along with level of denial for the remaining clients of the cluster desiring access to the shared resource. Advantageously, the share token parameter of the novel mechanism prevents rogue, non-member instances of the client application from accessing the shared resource, while the share reservation parameters enable explicit levels of access/denial to be specified by the client application.

Figure 6:
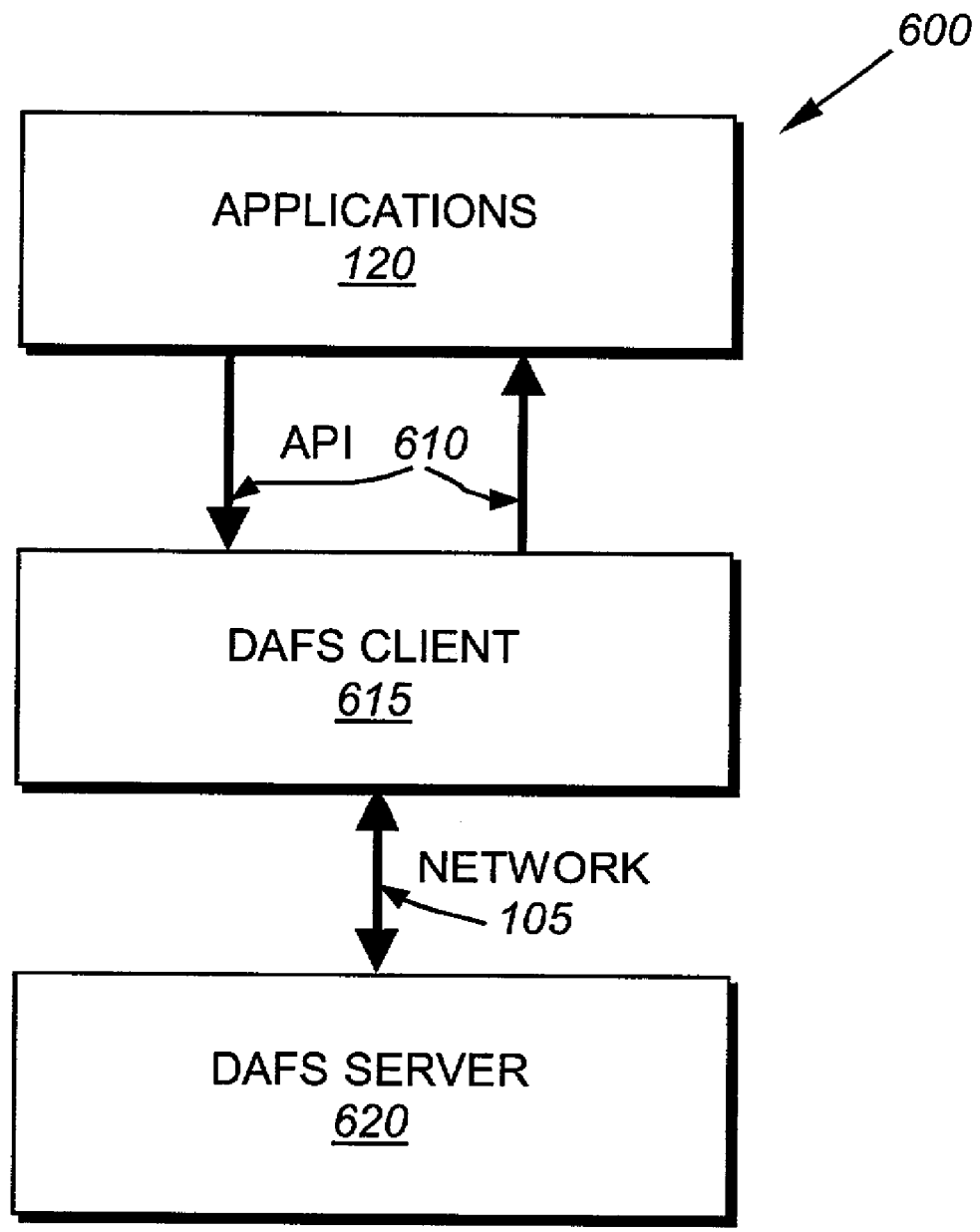
FIG. 6 is a schematic block diagram of an exemplary environment having an application, a DAFS client and a DAFS server in accordance with an embodiment of the invention.

Specifically, the DAFS protocol is extended to provide share token reservation that enable a set of cooperating clients (identified by a single shared token) to simultaneously access a shared resource, such as a file, while at the same time denying access to cooperating clients that are not members of the original cluster set (identified by a different token than the original one). Such an extension is shown in FIG. 6. An application 120, typically executing on a client, communicates with a DAFS client 615 via an application program interface (API) 610. The application can utilize the API to request that the DAFS client 615 perform certain data transfer operations. The DAFS client 615 communicates with a DAFS server 620 over a network 105. As described above, this network can include any acceptable form of networking that can accommodate the requirements of the DAFS protocol.

The present illustrative embodiment includes an entity independent of both the DAFS client 615 and DAFS server 620, e.g., a central authority 630 of a client application 120, that assigns share tokens to application instances for use in the open with share token operation. A client 110 may use this central authority to optimize its interaction with the DAFS server, by acquiring the proper share token from the authority before contacting the server. Thus the authority may function as a lock manager to ensure that only applications with an appropriate active token may open a particular file. The presence of the central authority 630 is for illustrative purposes only and is not essential to the practice of the invention.

Within the DAFS server is a set of expanded functions 235 that implement the novel open with share token and open_downgrade functions in accordance with the present invention. When an application 120 requests that a file be opened, the application 120 will instruct the DAFS client, via the API, to open the desired file with a certain token. The application will generate the token using well-known methodologies. The DAFS client will send a DAFS_PROC_OPEN command to the DAFS server 620 including a set of arguments contained in a data structure 300. The data structure will identify the requested file share access levels and levels of denial requested. If the file can be opened, i.e. no other application has opened the file, then the DAFS server 620 will open the file with the appropriate share token permissions. Share token permissions are provided to aid a clustered application to detect rogue instances of the application trying to perform conflicting accesses to a file. Such rogue access is a common source of corruption in clustered applications. The novel share token reservation capability allows a clustered application to ensure that all clients of a cluster instance share a share token reservation. Thus, multiple clients participating in the cluster instance can access the file, but when a client participating in a different cluster instance attempts the file, access is denied.

Operationally, an instance of a client application executing on a client node of the clustered application environment presents a share token to the operating system on the server node when requesting access (opening) of a shared resource, such as a file. The share token serves to coordinate activities of multiple instances of the client application executing on other client nodes of the cluster. If those instances possess the token currently being used to access the shared file, those instances can access the file. If an instance does not possess the current token, it is locked out. The first instance of the client application that accesses the file establishes the active, current share token. Subsequent instances of the application that attempt to open the file must either have obtained the token from the first instance (and is allowed to open the file) or has not communicated with the first instance of the client application and thus presents a different token (and is denied access to the file). Each instance of the client application generates a unique token value used to access the shared resource and, as noted, the first instance of that application that is allowed to open the file establishes the current, active share token.

Subsequent instances of a client application that attempt to open the shared file present their tokens to the operating system of the server using the "open with share token" operation. The server examines the current state of the shared file to determine whether there is a share token already in effect. If so, the tokens presented by the instances of the client applications are compared with the current, active share token and, if they match, those instances are allowed access to open the file. If any token presented by a subsequent instance of the application does not match the current share token, that open request is denied. Accordingly, subsequent instances of client applications executing on the cluster environment must synchronize with the first application instance that opened the shared file in order to acquire the current share token. This arrangement insures that coordination and synchronization among client applications are performed in the clustered application environment. Once the shared file is closed, the new current share token is established, as described above.

The foregoing has been a detailed description of the illustrative embodiment of the invention. Various modifications and additions can be made without departing from the spirit and scope of the invention. For example, it is understood that the various data structures can include additional information while remaining within the scope of the pre-sent invention. While this description has been written with reference to the DAFS protocol, it should be noted that the principles of the invention apply to any distributed access file system protocol. Further, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention.

What is claimed is:

1. A method for opening a file stored on a storage system, comprising:
   receiving an open request to access the file, the request including a share token, wherein the share token is generated by a client application instance;
   determining the file is not open;
   in response to the file not being open, opening the file using the share token;
   associating the open file with the share token to allow access by one or more client application instances within a cluster; and
   distributing, by the client application instance, the share token to other client application instances, wherein each client application instance is an instance of a database management system.

2. Apparatus for opening a file stored on a storage system, the apparatus comprising:
   means for receiving an open request to access the file, the request including a share token, wherein the share token is generated by a client application instance;
   means for determining the file is not open;
   in response to the file not being open, means for opening the file using the share token;
   means for associating the open file with the share token to allow access by one or more client application instances within a cluster; and
   means for distributing, by the client application instance, the share token to other client application instances, wherein each client application instance is an instance of a database management system.

3. A method for a server to coordinate access to a shared file, comprising:
   receiving a first open request for the shared file from a first client, the first open request including a first share token;
   opening the shared file;
   in response to receipt of the first open request, associating the first share token with the shared file;
   distributing, by the first client, a copy of the first share token to other clients, wherein each client is an instance of a database management system;
   subsequent to the step of associating and distributing, receiving a second open request for the shared file from a second client, the second open request including a second share token;
   comparing the first share token to the second share token;
   determining the first and second share tokens match; and
   granting access to the second client to the shared file in response to determining the first and second share tokens match.

4. The method of claim 3 wherein a match of the first and second share tokens indicates that the first and second clients have coordinated among themselves to share access to the shared file.

5. The method of claim 3 further comprising:
   removing association of the first share token with the shared file in response to receipt of a message from the first client, the message indicating the first client no longer desires access to the shared file.

6. The method of claim 3 wherein the first share token is generated by a central authority that transmits the first share token to the first client in response to a request.

7. The method of claim 3 wherein the first share token is generated by the first client.

8. An apparatus for coordinating access to a shared file, the apparatus comprising:
   means for receiving a first open request for the shared file from a first client, the first open request including a first share token;
   means for opening the shared file;
   means for associating the first share token with the shared file in response to receipt of the first open request;
   means for distributing, by the first client, a copy of the first share token to other clients, wherein each client is an instance of a database management system;
   means for receiving a second open request for the shared file from a second client, the second open request including a second share token;
   means for comparing the first share token to the second share token;
   means for determining the first and second share tokens match; and
   means for granting access to the second client to the shared file in response to determining the first and second share tokens match.

9. The apparatus of claim 8 wherein a match of the first and second share tokens indicates that the first and second clients have coordinated among themselves to share access to the shared file.

10. The apparatus of claim 8 further comprising:
    means for removing association of the first share token with the shared file in response to receipt of a message from the first client, the message indicating the first client no longer desires access to the shared file.

11. The apparatus of claim 8 wherein the first share token is generated by a central authority that transmits the first share token to the first client in response to a request.

12. The apparatus of claim 8 wherein the first share token is generated by the first client.

13. A computer readable medium containing executable program instructions for coordinating access to a shared file, the executable program instructions comprising program instructions for:
- receiving an first open request for the shared file from a first client, the open request including a first share token;
- opening the shared file;
- in response to receipt of the first open request, associating the first share token with the shared file;
- distributing, by the first client, a copy of the first share token to other clients, wherein each client is an instance of a database management system;
- subsequent to the step of associating and distributing, receiving a second open request for the shared file from a second client, the second open request including a second share token;
- comparing the first share token to the second share token;
- determining the first and second share tokens match; and
- granting access to the second client to the shared file in response to determining the first and second share tokens match.

14. A method for opening a file stored on a storage system, comprising:
- receiving an open request to access the file from a client application instance, the request including a share token;
- determining the file is not open;
- in response to the file not being open, opening the file using the share token;
- associating the open file with the share token to allow access to a limited number of client application instances within a cluster; and
- distributing, by the client application instance, the share token to other client application instances, wherein each client application instance is an instance of a database management system.

15. A system, comprising:
- a client configured with an application to generate a share token, and to send a request to a server to open a file with the share token;
- the server configured to determine the file is not open, and in response to the file not being open, to open the file using the share token, and to associate the open file with the share token to allow access to a limited number of clients within a cluster; and
- the client further configured to distribute the share token to other clients within the cluster, wherein each client is an instance of a database management system.

* * * * *